March 8, 1960 R. P. LAMBECK ET AL 2,927,648
PROPELLER CONTROL MECHANISM
Filed Oct. 19, 1954 2 Sheets-Sheet 1

INVENTORS
RAYMOND P. LAMBECK
ANTHONY V. POND
BY
ATTORNEY

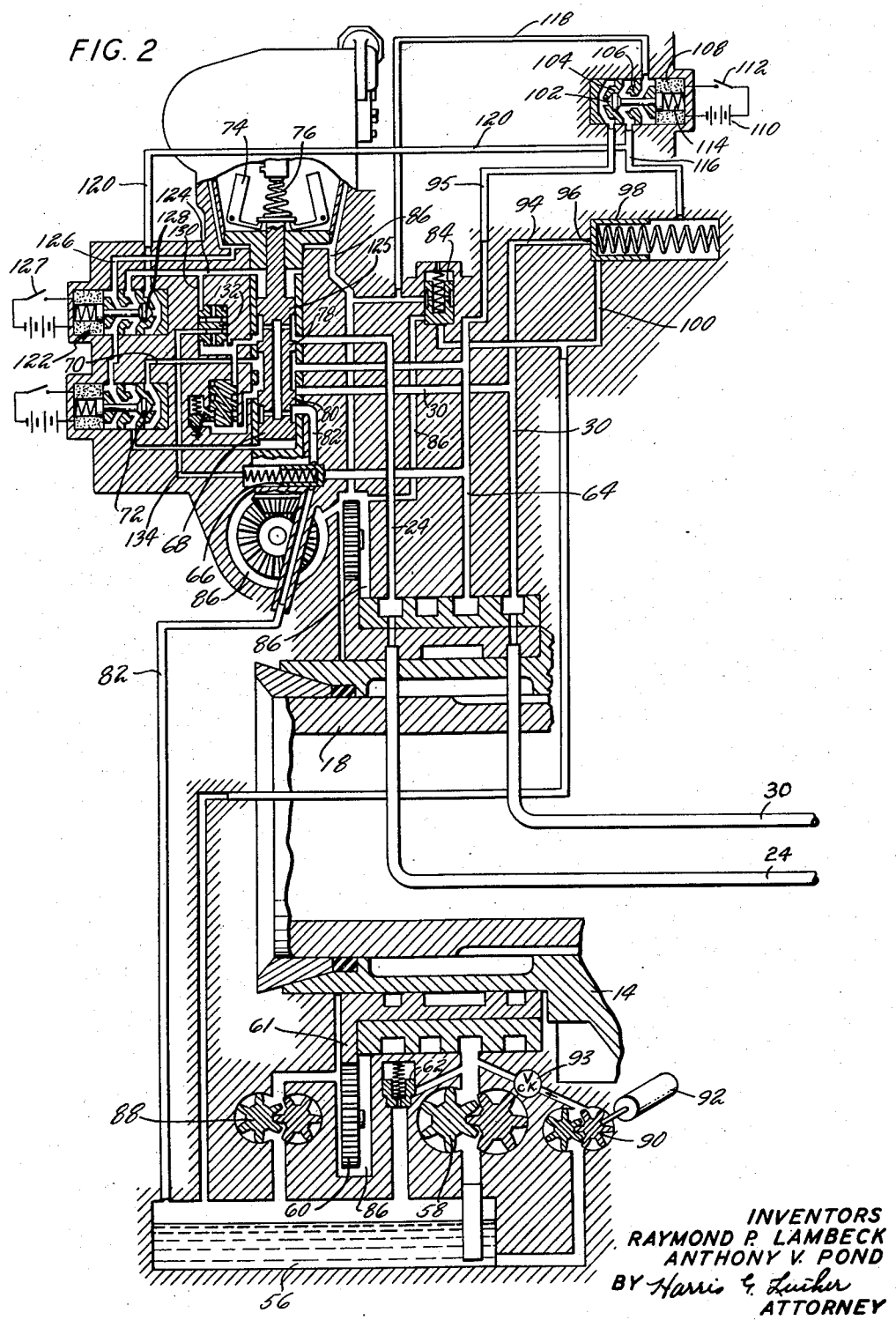

United States Patent Office 2,927,648
Patented Mar. 8, 1960

2,927,648

PROPELLER CONTROL MECHANISM

Raymond P. Lambeck and Anthony V. Pond, Manchester, Conn., assignors to United Aircraft Corporation, East Hartford, Conn., a corporation of Delaware Application October 19, 1954, Serial No. 463,121

19 Claims. (Cl. 170—160.2)

This invention relates to propeller control mechanism and particularly to propeller reversing mechanism.

An object of the invention is mechanism which will prevent inadvertent pitch reduction or reversal of a reversible pitch propeller.

A further object is mechanism which will prevent inadvertent withdrawal of the low pitch stops and movement of the propeller into reverse pitch.

A still further object is mechanism which will normally disable the reverse pitch mechanism.

Other objects and advantages will be apparent from the following specification and the attached drawings in which:

Fig. 2 is an enlarged view of schematic showing of the controls.

Figure 1:
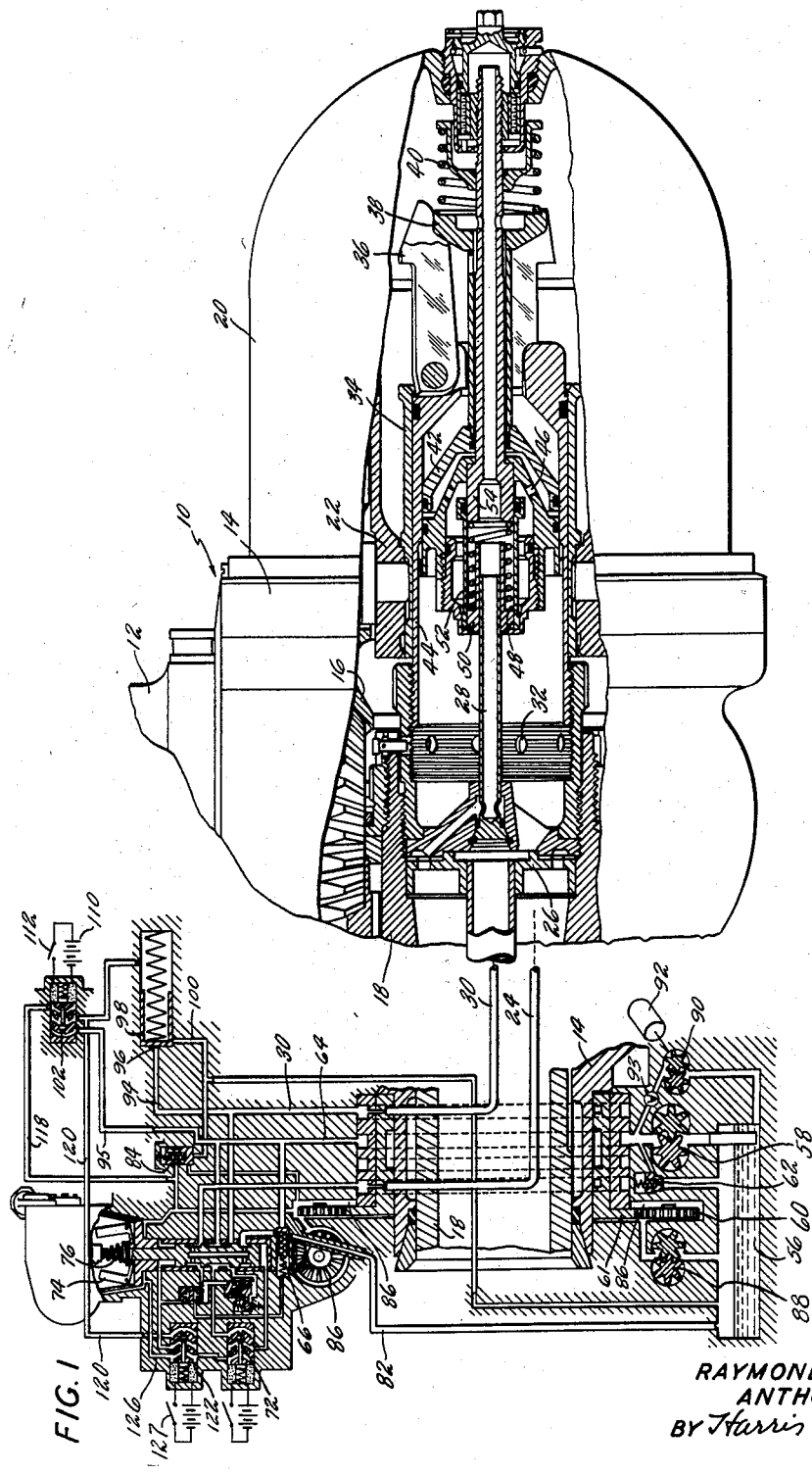
Fig. 1 is a side elevation of the propeller with portions broken away and a schematic view of the controls connected to said propeller.

In propellers of the general type shown in Forman Patent No. 2,477,868 and Anderson Patent No. 2,653,668 it is sometimes desirable to provide additional safety means to prevent inadvertent pitch reduction or reversal of the propeller such as might be caused by the inadvertent actuation of the reversing control switch or by an undue increase in the fluid pressure urging the propeller towards low pitch. In this general type of propeller mechanical stops determine the low pitch position which is usually a low forward pitch position beyond which the pitch cannot be reduced by normal fluid pressure. A predetermined increase in pressure will actuate stop withdrawing mechanism which will withdraw the low pitch stops and permit the propeller pitch to be further reduced and the blades turned to a reverse pitch position which is usually determined by mechanical stops such as shown and described in the Forman patent. The reversing mechanism includes an electrically actuated valve which will hydraulically force the governor valve to one extreme of its movement, disable the low pressure relief valve, and direct increased pressure fluid through the low pitch line to the propeller pitch actuating mechanism to remove the low pitch stops and turn the propeller to reverse pitch.

If the reverse pitch control should be accidentally actuated or if, while the propeller is underspeeding, excessive pressure should inadvertently get into the low pitch line the propeller might be inadvertently reversed.

The improvement which is the subject of this application provides a relief valve on the low pitch hydraulic line which will prevent the building up of sufficient pressure in the low pitch line to remove the low pitch stops. In addition this improvement normally connects the reversing valve pressure lines with a drain so that inadvertent actuation of the reversing valve will have no effect because no pressure will be supplied to the reversing valve, and the low pressure relief valve will not be disabled. Mechanism is provided in the form of an electrically actuated valve, connected with both the relief valve on the low pitch line and with the reversing mechanism, which will both disable the relief valve on the low pitch line and connect the reversing valve with the pressure in the low pitch line so that when this last mentioned electrically actuated valve is energized and the reversing valve is also energized increased pressure may be supplied through the reversing valve to the low pitch line and thus remove the low pitch stops and force the propeller into the reverse pitch position against the mechanical reverse stops.

It will thus be apparent that this improved mechanism insures against inadvertent reversing and inadvertent pitch reduction by limiting the pressure in the low pitch line and preventing application of pressure through the reversing valve and requires the deliberate actuation of both the safety mechanism and the reversing mechanism in order to effect reversal.

While this mechanism may be applied to other types of propellers, for purposes of illustrating the invention it has been applied to the type of propeller shown in Forman Patent 2,477,868 with the type of control shown in the Anderson Patent 2,653,668 to which reference may be made for more details of both the propeller and the controls. The propeller indicated generally at 10 has the desired number of blades 12, only one of which is shown, mounted for pitch changing movement in a hub 14 and geared together in the usual manner by gears 16. Hub 14 is mounted on shaft 18 driven in a well-known manner by any suitable source of power such as an engine or turbine (not shown) and carries at its forward end pitch changing mechanism including a cylinder or dome 20 in which a piston 22 is mounted for reciprocating movement. Piston 22 is connected in a well-known manner by cams such as shown in the above-identified patents with the gear 16 for turning the propeller blades to change their pitch upon reciprocation of the piston 22. Piston 22 is reciprocated by the application of fluid, usually oil, under pressure to one side of the piston, the other side being connected with drain or a reduced pressure. Control mechanism, described hereinafter, selects the side of the piston to which pressure will be applied in accordance with the directional requirements of the control mechanism to thus determine the direction of movement of the piston. In the modification shown pressure fluid led through line 24 after passing through a distributing plug 26 is led through a tube 28 to the front side of the piston to force it rearwardly and turn the propeller toward high pitch. Pressure fluid led through the line 30 passes by the distributing plug 26 and outside of the tube 28 from where it can pass through holes 32 and act on the rear face of the piston to force the piston forward or outboard and turn the propeller toward low pitch. As the piston moves outboard, sleeve 34 connected with the piston moves outboard until the end of the sleeve contacts retractable low pitch stops 36 which prevent further movement of the piston and determine the low pitch position of the propeller blades. Stops 36 are held in extended position by a wedge ring 38 spring urged into position under the stops by spring 40. Wedges 38 are connected with a piston 42 mounted in a cylinder formed in sleeve 44 secured to the shaft 18. The wedges 38 may be withdrawn from under the stops 36 to permit withdrawal of the stops by movement of the piston 42 to the right as seen in Figure 1. The outboard side of piston 42 is hydraulically connected with the outboard side of piston 22 and hence is always subject to the pressure on the high-pitch side of the pitch changing mechanism. The inboard side of piston 42 is normally also hydraulically connected, through passages 46 and 48, with the outboard said of the propeller so that pressure on the outboard side of the piston 22 normally has no material effect on piston 42. The area at the inboard side of piston 42 is normally sealed from the pressure on the inboard side of piston 22 by plugs and packings and by valve 50 urged to closed position by spring 52. This spring is strong enough to prevent opening of valve 50 by the normal working pressures supplied by the governor through low pitch line 30 which pressure is about 100–120 lbs. per square inch differential between opposite sides of the piston 22 but this spring is weak enough so that a differential pressure of about 250 lbs. per square inch will open valve 50. When the reverse pitch mechanism is energized pressure higher than governor pressure will be supplied and it may even be as high as 800–1000 lbs. per square inch. This pressure directed through channel 30 to the inside of sleeve 44 will open valve 50. As soon as valve 50 is open the larger area then subjected to the higher pressure will force the valve 50 to its extreme position where the tail end of valve 50 will seat on the tube 54 and the land portion of valve 50 will open ports 48 thus permitting the higher pressure oil to pass through ports 48 and ports 46 to the inboard side of piston 42 thus moving piston 42 outboard and removing wedges 38 from under the stops 36 and permitting the piston 22 to continue outboard and move the propeller blades into a reverse pitch position.

It is believed that the above explanation will be a sufficient description of the propeller for a complete understanding of the present invention. For a more complete description of the propeller, reference may be had to the Forman Patent 2,477,868.

To illustrate the present invention it has been incorporated in a control such as shown in Anderson Patent 2,653,668. Oil from a sump 56 is placed under pressure by a pump 58 driven through a gear 60 from a gear 61 driven by shaft 18 through hub 14. A high pressure relief valve 62 limits the high pressure of this pump. Fluid from the pump is led through line 64 to low pressure relief valve 66 which limits the normal working pressure of the pump and also to the central portion of governor valve 68 and through line 70 to the pressure side of feathering valve 72 whose function and construction is explained in more detail in Anderson Patent 2,653,868. It is believed that a further understanding of the feathering valve is not necessary for a complete understanding of the present invention. Governor valve 68 is actuated by the usual flyweights 74 and spring 76 and may be adjusted for a selected speed setting by adjusting the force of spring 76 in a manner well-known in the art. Valve 68 has two spaced lands 78 and 80 which are moved with valve 68 to selectively connect high pitch line 24 and low pitch line 30 with line 64. When either one of these lines is connected with pressure line 64, the other line is connected through line 82 with the pressurized sump 56. A sump relief valve 84 is vented to atmosphere and maintains a predetermined pressure in the sump 56. Upon actuation, valve 84 spills oil back into the interior 86 of the control housing from where the oil is pumped by scavenge pump back into the pressurized sump 56. An auxiliary pump 90 driven by an electric motor 92 is connected to withdraw oil from the pressurized sump 56 and feed it through a check valve 93 into the pressure line 64 at any desired time to supply additional pressure fluid whether the pump 58 is running or not.

A line 94 is led off of low pitch line 30 between the propeller and its control mechanism and connected to the front side 96 of a relief valve 98 which is connected upon actuation to spill oil through line 100 back into the pressurized sump 56. Valve 96 is so constructed that it will normally relieve at a pressure well below the pressure required to operate valve 50 and remove the low pitch stops. A valve 102 having valve seats 104, 106 is connected for electrical actuation as by a solenoid 108 batteries 110 and switch 112. This valve is normally urged as by a spring 114 to the lefthand position as shown in Fig. 1. In this position line 95 leading from pump pressure line 64 is blocked. Line 116 leading from the rear of relief valve 98 connects with valve 102 between seats 104 and 106 and line 118 connects the space between the seats 104 and 106 with the interior 86 of the control housing which is at atmospheric pressure and thus acts as a drain. Thus in the position shown in Figs. 1 and 2, the space at the rear of relief valve 98 is connected through line 116 and valve 102 with drain or atmospheric pressure. In this position of valve 102, valve 98 will relieve at a pressure above the pressure maintained by low pressure relief valve 66 but below the pressure required to actuate valve 50 and hence will permit normal governed operation of the propeller but will prevent building up sufficient pressure to release the low pitch stop mechanism. Line 116 has a branch 120 connected with the pressure side of the reversing valve 122 as shown in Figs. 1 and 2 so that the pressure side of the reversing valve is also connected with drain or atmospheric pressure through valve 102. Line 124 connects the reversing valve with pilot valve actuating motor in the form of a piston 125 at the top of the pilot valve 68. The reversing valve also has a drain line 126 connecting it with the interior of the control housing which is at atmospheric pressure. An electrically actuated plunger 128 serves to connect line 124 at the top of the pilot valve 68 with either the drain line 126 or the line 120 and block the line not connected. Thus the top of the pilot valve is normally connected with drain, as shown, through the line 126. Upon actuation of the reversing valve however the drain line 126 is blocked and the top of the pilot valve is connected with line 120. Line 120 may be connected with drain as shown, or with pump pressure line 64 through line 95 upon actuation of the electrical device 108, which will move the valve 102 to the right as viewed in Figure 1, to block drain line 118 at seat 106 and move valve 102 away from its position on seat 104 to connect line 95 with line 116 and line 120. Line 120 being thus connected with pump pressure, will actuate piston 125 to disable the governor and move the pilot valve 68 down as shown to thus connect the pressure line 64 with the low pitch line 30.

Movement of valve 102 to the right will also connect line 95 with line 116 to apply pump pressure in line 30 to the back side of relief valve 96 thus in effect disabling relief valve 96, permitting the pressure in the low pitch line to attain any pressure selected by the control mechanism. Line 124 connecting the reverse pitch valve 122 with the top of the pilot valve has a branch 130 connected with a shuttle valve 132 controlling the application of pressure to line 134 leading to the back side of low pressure relief valve 66 so that application of low pitch pressure to the top of the pilot valve through line 124 will apply pump pressure to the back side of relief valve 66 thus permitting the pump 58 or the pump 90 if it happens to be operating to build up a pressure in line 64 and the lines connected thereto, including line 30, limited only by the high pressure relief valve 62.

From the above description it will be apparent that we have provided a mechanism such that if neither the valve 102 nor the valve 122 have been electrically actuated then pressure cannot be built up in the low pitch line sufficiently high to actuate the piston 42 to withdraw the wedge 38 from under the stops 36 so that the propeller cannot be forced beyond the position determined by the low pitch stops even by an attempted increase in pressure in the low pitch line. Inadvertent actuation of the reverse valve 122 will have no effect because the line 120 is connected with atmosphere and actuation of the reverse valve 122 by closing switch 127 will only connect the top of the pilot valve with atmosphere and will thus produce no pitch reducing action. Inadvertent actuation of valve 102 will also have no effect since pressure in line 120 will not go beyond reversing valve 122 and therefore will not be applied on the pilot valve at land 125 or behind low pressure relief valve 66. It is only when both valves 102 and 122 are simultaneously actuated that governing can be disabled, the propeller directed toward a reduced blade angle, the low pitch stops withdrawn and reversing effected.

While control mechanism has, it is believed, been explained in sufficient detail to provide a complete understanding of the present invention, reference may be made to the Anderson Patent 2,653,668 for further details. With reference to the structure shown in the Anderson Patent 2,653,668 it will be apparent that the present invention constitutes an improvement on that structure by inserting a relief valve in the low pitch line, disconnecting the reversing solenoid from the pressure source and controlling both the inserted relief valve and the pressure to the reversing solenoid by a third valve which will selectively connect the back side of the inserted relief valve and the pressure side of the reversing solenoid with either a drain, shown as being at atmospheric pressure, or with the pressure in the pump line.

The electrical controls for the valve 102 are preferably separately manually actuated by a switch which may be called an arming switch for preparing the mechanism for reversing after the wheels touch the ground or the boat touches the water. The electrical controls for the reversing valve 122 are shown schematically as manually actuatable but are preferably incorporated in a combined semi-automatic system such as that shown in Anderson Patent 2,653,668. An explanation of this electric system is not believed necessary for an understanding of the present invention.

Although only one embodiment of this invention has been illustrated and described herein, it is to be understood that the invention is not limited to the construction so illustrated and described, but that such changes in size, shape and arrangement of parts may be resorted to as come within the scope of the subjoined claims.

We claim:

1. In combination with a hydraulically actuated device having a working range and a special purpose range beyond the working range, a hydraulic line leading to said device, means connected with said line supplying fluid under an operating pressure to said device to actuate said device in said working range, means directing fluid under a higher pressure to said line to move said device in said special purpose range, a relief valve connected with said line and acting to limit the pressure in said line to a pressure less than said higher pressure, and prevent the application to said device of fluid under said higher pressure, selecting means having two positions and connected with said line, said relief valve, and said directing means, and including means for disabling said relief valve and means for disabling said directing means, and operable in one position to enable said relief valve and disable said directing means and in the other position to enable said directing means and disable said relief valve.

2. A device as claimed in claim 1 having stops dividing the working range from the special purpose range and preventing movement of the device from the working range to the special purpose range, and having means, actuated by the application of said higher pressure to said device, disabling said stops.

3. A device as claimed in claim 1 in which said selecting means comprises a valve having means selectively connecting the rear of said relief valve with a drain or with a source of pressure to selectively enable or disable said relief valve.

4. A device as claimed in claim 1 in which said selecting means comprises a valve having means selectively connecting said directing means with a drain or with a source of pressure to selectively disable or enable said directing means.

5. A device as claimed in claim 4 in which said directing means comprises a movable pilot valve and a first valve having an inlet connected with said selecting means and an outlet connected with said pilot valve.

6. A device as claimed in claim 5 having a pilot valve movable to direct fluid to said line, and a motor for moving said pilot valve, and having an operating-pressure relief valve connected with said means supplying fluid under an operating pressure, and in which the outlet of said first valve is connected with said motor to actuate said pilot valve and with the rear of said operating pressure relief valve to disable the same.

7. A device as claimed in claim 6 in which said device is a speed controlling device and has speed responsive mechanism controlling said pilot valve and in which said first valve directs fluid to said motor to disable said speed responsive mechanism.

8. In an hydraulically actuated aeronautical propeller having a normal operating range and a reverse pitch range and having low pitch stops dividing the normal operating range from the reverse range and in which fluid at a predetermined pressure is utilized to change the propeller pitch in the normal operating range and fluid at a higher pressure in the low pitch hydraulic line is necessary to remove the low pitch stops and move the propeller into reverse, means preventing inadvertent removal of said low pitch stops comprising a relief valve in the low pitch hydraulic line set to relieve at a pressure less than that required to remove said stops, a first valve connected with the rear of said relief valve and normally hydraulically connecting the rear of said relief valve with a drain, a governor, a pitch reversing valve connected with said governor to move the governor into reversing position, means connecting the rear of said relief valve with the inlet of said reversing valve, said first valve being movable to block said drain, and hydraulically connect the rear of said relief valve and the inlet of said reversing valve with a pressure source, whereby pressure may be built up in said low pitch line to remove said stops and pressure may be fed to said reversing valve to move the governor into reversing position.

9. In combination with a reversible pitch propeller, a governor, a reversing valve for directing fluid to said governor to move the governor into a pitch reducing position, means for supplying fluid to said reversing valve comprising a fluid line leading to an inlet of said reversing valve, a second valve controlling said fluid line and normally connecting said line with drain but movable to connect said line with a pressure supply in said propeller.

10. In combination with a reversible pitch propeller having a low pitch hydraulic line leading to said propeller, a relief valve on said low pitch line, means for directing fluid to move said propeller in a pitch reducing direction including a reversing valve having an inlet and an outlet, means for supplying fluid to said reversing valve comprising a fluid line leading to said reversing valve inlet, a second valve controlling said fluid line, a fluid connection between said fluid line and the rear of said relief valve, said second valve being connected with a pressure source and a drain and movable to selectively connect said reversing valve inlet and the rear of said relief valve with the pressure source or with drain.

11. In combination with a hydraulic controllable pitch propeller having a working range and a special purpose range beyond the working range and pitch stops normally preventing movement of said propeller from said operating range into said special purpose range, a hydraulic line leading to said propeller, means connected with said line supplying fluid under an operating pressure to said propeller to actuate said propeller in said working range, means directing fluid under a higher pressure to said line to move said propeller in said special purpose range, means hydraulically connected with said line and actuatable by said higher pressure for disabling said stops, a relief valve connected with said line and acting to limit the pressure in said line to a pressure less than said higher pressure and prevent the application of said higher pressure to said propeller and said stop-disabling means, a selector valve having two positions and connected with said line, said directing means, the rear of said relief valve and a drain movable to selectively connect said directing means and the rear of said relief valve with drain or with the pressure in said line.

12. A propeller as claimed in claim 11 in which said means for supplying fluid under an operating pressure includes a speed governor and said directing means includes a governor actuating motor and a special purpose valve for energizing said motor and actuating said governor to disable the governing function and direct said higher pressure fluid to said line.

13. In combination with a hydraulically actuated device having a working range and a special purpose range beyond the working range, a hydraulic line leading to said device, a control valve connected with said hydraulic line for supplying fluid to said hydraulic line to move said device toward and in said special purpose range, means controlling said valve including a second valve for directing control fluid to said control valve, and a third valve normally connecting said second valve with a drain and blocking the flow of controlling fluid to said second valve, a source of fluid pressure connected to said third valve, independent means for independently actuating said second and third valves, and second and third valves when simultaneously actuated connecting said source of pressure with said second valve and said control valve to move said control valve to supply fluid to said hydraulic line.

14. In combination with a hydraulically actuated device having a working range and a special purpose range beyond the working range, a hydraulic line leading to said device, a first valve connected with said hydraulic line for supplying fluid to said hydraulic line to move said device toward and in said special purpose range, means controlling said first valve including a second valve having an outlet, a drain, and an inlet, and normally connecting said outlet and drain and blocking said inlet, a source of fluid pressure connected with said inlet and means for moving said second valve to connect said outlet with said source and inlet, a third valve having an outlet, a drain, and an inlet, and normally connecting its outlet with its drain, the outlet of said second valve being connected with the inlet of said third valve and the outlet of said third valve being connected with said first valve for controlling said first valve, means for moving said third valve to connect its inlet with its outlet to direct controlling fluid to said first valve when said second valve is moved to connect its outlet with its inlet, and independent means for independently actuating said second and third valve moving means.

15. Device as claimed in claim 14 including a relief valve in said hydraulic line and means connecting said second valve with said relief valve to disable said relief valve upon actuation of said second valve.

16. In combination with a reversible pitch propeller having a reversing valve and pitch reducing mechanism, said valve having a fluid outlet connected with said pitch reducing mechanism, a fluid inlet and a continuously open drain, means for supplying fluid to said reversing valve comprising a fluid line leading to said inlet, said valve normally connecting said outlet with said drain, means for actuating said valve to connect said fluid outlet with said fluid inlet for directing fluid to said pitch reducing mechanism, a second valve controlling said fluid line and having a drain and a pressure connection, said second valve connecting said line with drain in one position and connecting said line with pressure in another position.

17. In combination with a hydraulic controllable pitch propeller having an operating range and a special purpose range, and pitch stops normally preventing movement of said propeller from said operating range into said special purpose range, hydraulically actuated means for disabling said stops, control mechanism for said propeller and said means, a special purpose valve having an inlet, a fluid outlet, and a continuously open drain, means connecting said outlet with said control mechanism, a fluid inlet line leading to said inlet for supplying fluid to said valve, said valve normally connecting said outlet with said drain, means for actuating said valve to connect said fluid outlet with said fluid inlet for directing fluid to said control mechanism to move said propeller toward said special purpose range and to actuate said hydraulically actuated means to disable said stops, a second valve controlling said fluid inlet line, a drain and a pressure source connected with said second valve and means for moving said second valve to selectively connect said inlet with either said pressure source or said drain.

18. In combination with a reversible pitch propeller, a governor, a reversing valve for directing fluid to said governor to move the governor into a pitch reducing position, a pitch reducing fluid line for said propeller including a relief valve on said pitch reducing line, means for supplying fluid to said reversing valve and to the rear of said relief valve comprising fluid lines leading to an inlet of said reversing valve and to the rear of said relief valve and valve means selectively controlling said fluid lines and normally connecting said lines with drain but movable to connect said lines with a pressure supply.

19. In combination with a reversible pitch propeller having pitch reducing mechanism and a reversing valve for directing fluid to said mechanism to move said propeller in a pitch reducing direction, said pitch reducing mechanism including a low pitch line for conducting pressure fluid to said propeller to reduce the propeller pitch, a relief valve on said low pitch line for limiting the pressure in said low pitch line, means for supplying fluid to said reversing valve and to the rear of said relief valve, said means comprising fluid lines leading to an inlet of said reversing valve and to the rear of said relief valve and valve means controlling said fluid lines and having drain and pressure connections, said valve means selectively connecting said lines with drain or with pressure.

References Cited in the file of this patent

UNITED STATES PATENTS 2,600,017 Morris et al. _____ June 10, 1952